United States Patent [19]
Kim

[11] Patent Number: 5,415,458
[45] Date of Patent: May 16, 1995

[54] DRIVER SEAT LOCK MECHANISM FOR PREVENTING VEHICLE THEFT

[76] Inventor: Ki I. Kim, 826 S. Berendo St., Los Angeles, Calif. 90005

[21] Appl. No.: 123,909

[22] Filed: Sep. 21, 1993

[51] Int. Cl.⁶ .................................................. A47C 1/00
[52] U.S. Cl. ............................ 297/378.14; 297/378.1; 70/261
[58] Field of Search ................ 297/378.14, 378.1, 353, 297/354.1, 299, 300, 285, 291–293, 304, 306; 70/256, 257, 261

[56] References Cited

U.S. PATENT DOCUMENTS

| | | | |
|---|---|---|---|
| 289,115 | 11/1883 | McDonald | 297/292 |
| 4,116,297 | 9/1978 | Ross et al. | 297/378.1 X |
| 4,897,644 | 1/1990 | Hirano | 70/257 X |
| 5,028,086 | 7/1991 | Smith | 297/378.1 X |
| 5,263,347 | 11/1993 | Allbaugh et al. | 70/257 |

FOREIGN PATENT DOCUMENTS

| | | | |
|---|---|---|---|
| 2908611 | 10/1980 | Germany | 297/378.1 |
| 3042033 | 6/1982 | Germany | 70/261 |
| 2059757 | 4/1981 | United Kingdom | 297/378.1 |
| 2102363 | 2/1983 | United Kingdom | 70/261 |
| 2248593 | 4/1992 | United Kingdom | 70/261 |

Primary Examiner—Kenneth J. Dorner
Assistant Examiner—Milton Nelson, Jr.
Attorney, Agent, or Firm—Irving Keschner

[57] ABSTRACT

A mechanism to lock the driver seat in a vehicle in a forward position to prevent a thief from getting on the seat and driving away in the vehicle. The seat adjuster is positioned such that the seat back portion is at an angle with the horizontal seat portion. A lock mechanism mounted on the seat back plate and either manually or electronically operated, causes a lock pin to enter coaligned apertures formed in the front and back plates of the seat adjuster, an intermediate plate member preventing the seat back portion from being moved. In order to enable the seat adjuster to resume its normal operation, the locking pin is withdrawn from the coaligned apertures.

6 Claims, 3 Drawing Sheets

DRIVER SEAT LOCK MECHANISM FOR PREVENTING VEHICLE THEFT

BACKGROUND OF THE INVENTION

1. Field of the Invention

The present invention provides a cost effective vehicle anti-theft system which utilizes a mechanism to lock the seat back in a position which prevents the vehicle from being driven by an unauthorized person.

2. Description of the Prior Art

A number of anti-theft devices for disabling vehicles if not operated by an authorized person have been available in the prior art. For example, U.S. Pat. No. 3,641,492 to Vinokur discloses an anti-theft device for vehicles which is connectable between the horn, running lights and cigarette lighter circuits, the cigarette lights being used to temporarily deactivate an anti-theft alarm; U.S. Pat. No. 3,525,414 to Copelan discloses an automotive ignition circuit for preventing unauthorized starting of the engine and utilizes a concealed push button reset switch; U.S. Pat. No. 4,063,610 to Shilling discloses a vehicle theft-prevention system having a concealed switch operable to disable the ignition system; and U.S. Pat. No. 4,320,382 to Roucek discloses a vehicle alarm system wherein depression of the horn ring disables the alarm and connects the normal circuits of the car for operation.

An anti-theft device which has had recent commercial success is an extendible mechanism which is first aligned with the vehicle steering wheel and then adjusted such that opposite ends engage the steering wheel. A key locking mechanism is then engaged such that the ends cannot be moved, preventing the steering wheel from rotating a sufficient degree to allow an unauthorized person from controlling the direction of the moving vehicle.

An electronic system is also available which, when mounted on a vehicle, sends out position signals which are detected at a receiving station, enabling law enforcement to recover the vehicle if stolen.

All the above systems, although each having desirable features, are relatively expensive. For example, the steering wheel locking mechanism although relatively inexpensive, is not effective in deterring a professional thief. On the other hand, an electronic monitoring system, although effective, costs approximately $700.00, a factor which inhibits its widespread use.

What is therefore desirable is to provide a simple and cost effective system for preventing vehicle theft.

SUMMARY OF THE PRESENT INVENTION

The present invention provides a mechanism for locking the driver seat in a vehicle in a forward position to prevent a thief from getting on the seat and driving away in the vehicle. The seat adjuster is positioned such that the seat back is at an angle with the horizontal seat portion. A lock mechanism mounted on the seat back plate and either manually or electronically operated, causes a lock pin to enter coaligned apertures formed in the front and back plates of the seat adjuster an intermediate plate member via a push spring, preventing the seat back from being moved. In order to enable the seat adjuster to resume its normal operation, the locking pin is withdrawn from the apertures.

The present invention thus provides a simple and cost effective technique for preventing the theft of a vehicle even if an unauthorized person has the capability of starting the vehicle.

BRIEF DESCRIPTION OF THE DRAWINGS

For a better understanding of the invention as well as other objects and further features thereof, reference is made to the following description which is to be read in conjunction with the accompanying drawings wherein.

DESCRIPTION OF THE PRESENT INVENTION

Figure 1:
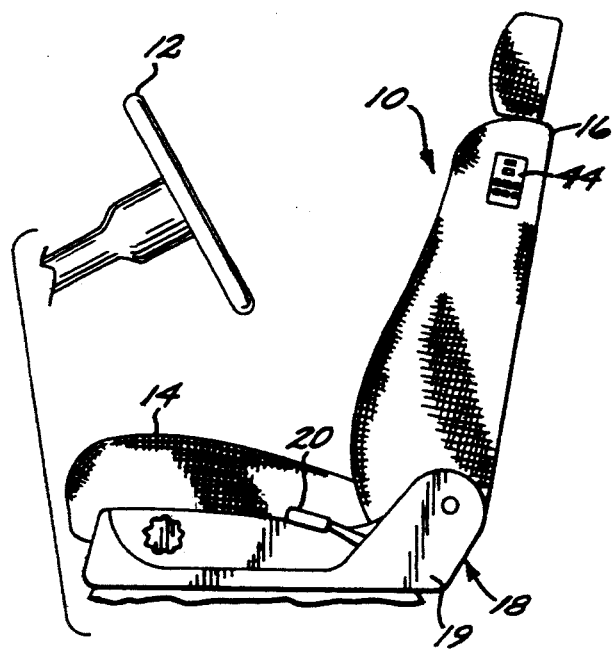
FIG. 1 is a side view illustrating a typical vehicle driver seat with the back seat portion in position to properly seat a driver.
Figure 2:
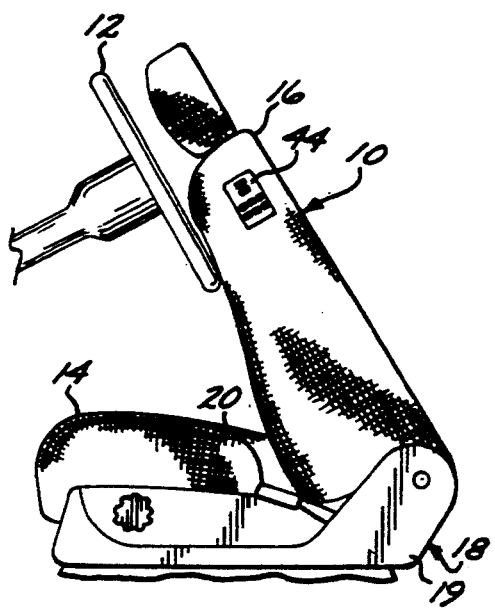
FIG. 2 is a side view illustrating the driver seat of FIG. 1 with rear seat portion inclined forward to allow a passenger in the rear to exit the vehicle.

Referring now to FIGS. 1 and 2, a simplified side view of the interior cabin of a vehicle showing a driver's seat 10 and steering wheel 12. The driver seat 10 comprises a horizontal seat portion 14, back seat portion 16 and a mechanism 18, covered by member 19, which allows the back seat portion, via seat adjuster 20, to be angularly positioned from the position shown in FIG. 1 which allows a driver to operate the vehicle to the position shown in FIG. 2 which enables a passenger in the rear of the vehicle to exit or, in general, allow greater access to the rear cabin area of the vehicle.

Figure 3:
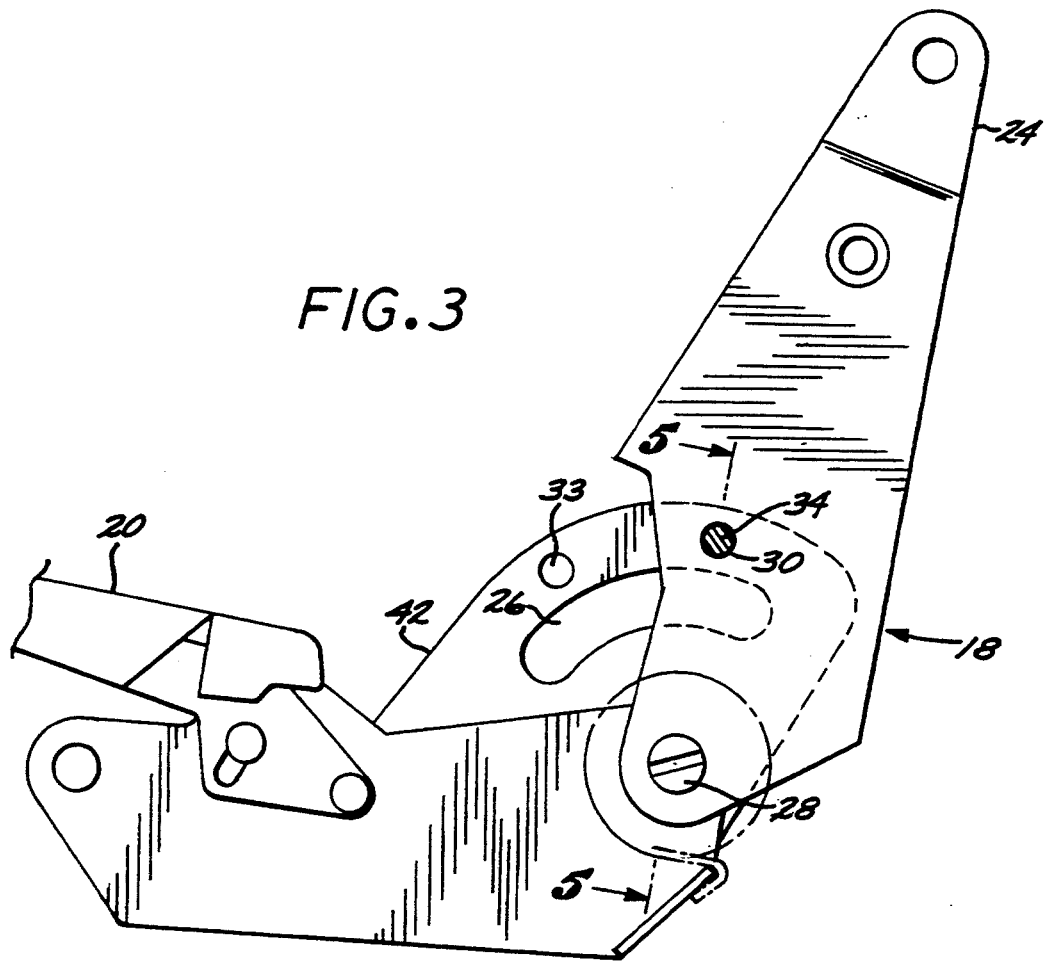
FIG. 3 illustrates the mechanism utilized to allow the back seat portion to move between the positions shown in FIGS. 1 and 2 modified in accordance with the teachings of the present invention, the mechanism being shown in the position corresponding to the back seat portion position shown in FIG. 1.
Figure 7:
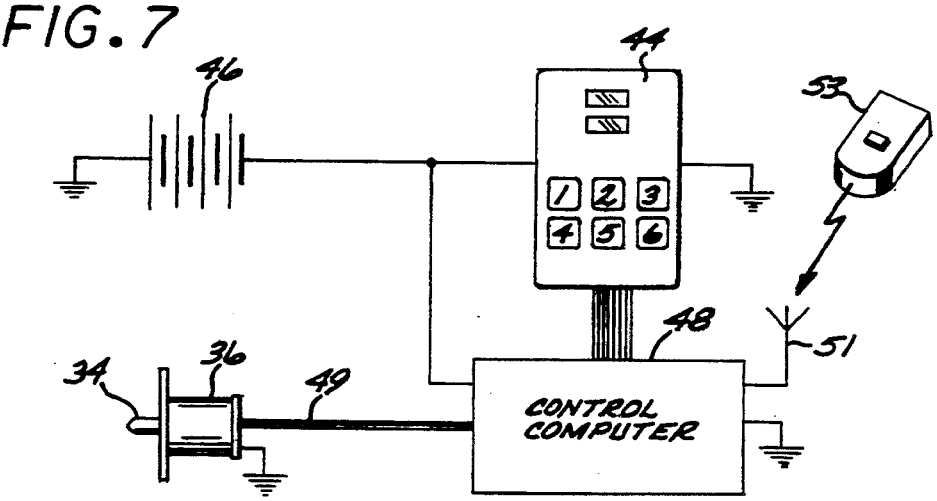
FIG. 7 is a simplified block diagram illustrating how the locking device of FIGS. 5 and 6 is controlled.
Figure 8:
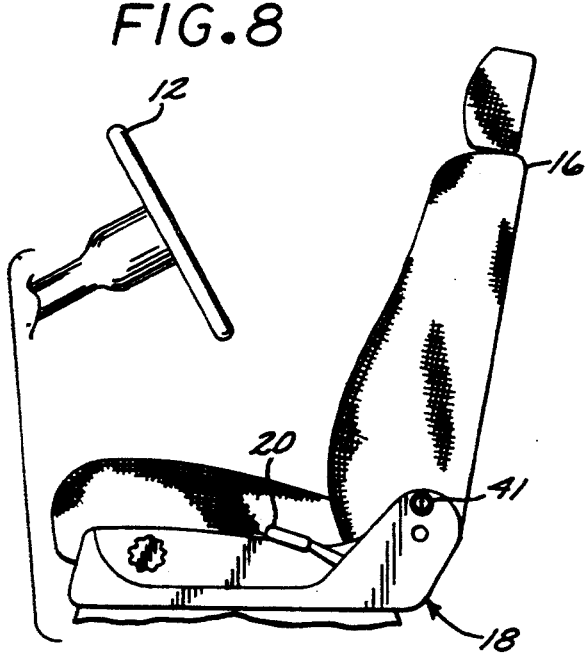
FIG. 8 illustrates the use of another locking device in conjunction with a vehicle back seat portion.
Figure 9:
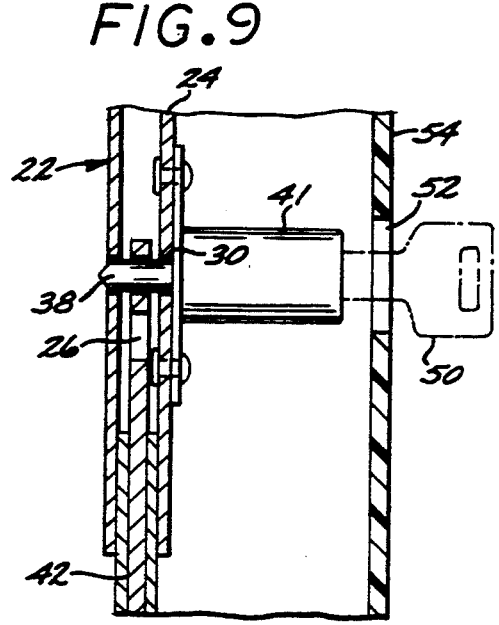
FIG. 9 is a cross-sectional view illustrating in more detail the locking device shown in FIG. 8.

A more detailed view of mechanism 18 is shown in FIG. 3. The mechanism comprises an intermediate plate member 42, a shaped back plate 24, elliptically shaped recess 26 and central base-bar, or pivot rod, 28. In accordance with the teachings of the present invention at least two apertures 33 and 35 are formed in intermediate plate member 42 to receive the lock pin 34 (FIGS. 5–7) of the electronically operated locking mechanism 36 or the lock pin 38 of manual lock 41 (FIGS. 8 and 9).

Figure 4:
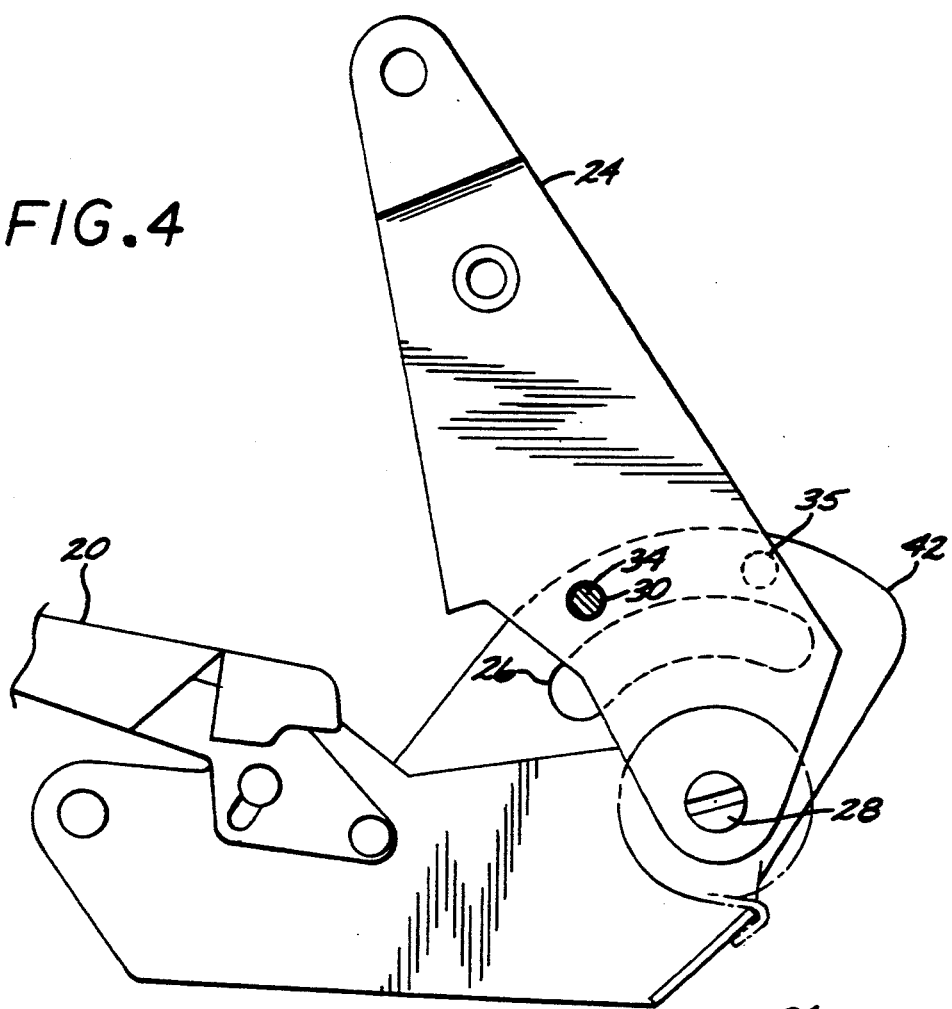
FIG. 4 illustrates the mechanism of FIG. 3 shown in the position corresponding to the back seat portion position shown in FIG. 2.

The positioning of the components comprising mechanism 18 as shown in FIG. 3 corresponds to the position of back seat portion 16 as shown in FIG. 1. In this case, lock pin 34 extends through aperture 30. FIG. 4 illustrates the situation when back seat portion 16 is positioned as shown in FIG. 2 with lock pin 34 extending through aperture 32.

Figure 5:
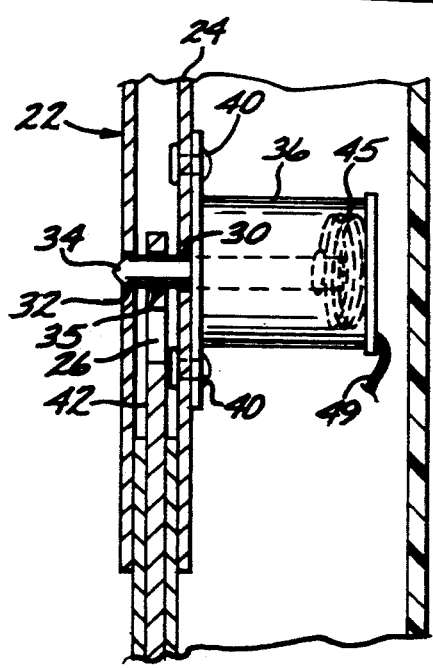
FIG. 5 illustrates the use of an electronically controlled locking device to lock the back seat portion in the position shown in FIG. 2.

FIG. 5 illustrates electronically operated locking mechanism 36, which typically comprises a solenoid, mounted to back plate 24 by fasteners 40. Although only two fasteners are illustrated, typically four are utilized (preferably, the locking mechanism 36 is welded to back plate 24). Intermediate plate member 42 is positioned between front plate 22 and back plate 24 as illustrated and has apertures 33 and 35 formed thereon. Apertures 30 and 32 are formed in front plate 22 and back plate 24, respectively.

Figure 6:
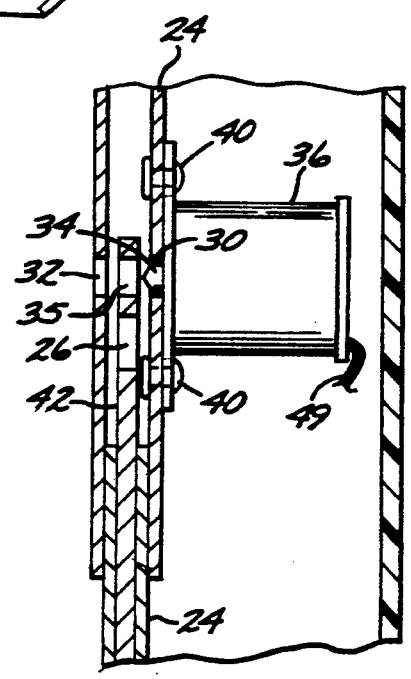
FIG. 6 illustrates the locking device shown in FIG. 5 in the deactivated, unlocked position.

The embodiment illustrated in FIGS. 1-7 operates as follows:

A conventional data entry device 44 is mounted on back seat portion 16 as illustrated. As shown in the schematic diagram of FIG. 7, a battery 46 provides operating voltage to device 44 and a control microprocessor 48. In essence, an authorized user of the vehicle enters the correct code via device 44 which in turn causes the microprocessor to provide a signal to mechanism 36 via cable 49 to retract locking pin 34 from coaligned apertures 30, 32 and 35 (or 33) as shown in FIG. 6 (unlocked position). Locking pin 34 is retracted for a predetermined period, preferably five seconds. This allows the driver to position back seat portion 16 to either of the positions shown in FIGS. 1 and 2 (although not illustrated, means are provided to clearly indicate to the driver when apertures 30 and 32 are aligned with aperture 35 in intermediate plate member 42). After the five second period, the retraction signal from microprocessor 48 is ended and locking pin 34 is forced by a push spring 45 through either aperture 33 or 35 and coaligned apertures 30 and 32 locking back seat position 16 in the corresponding position. The use of springs to force a locking pin in a first direction (in this case, towards the apertured front plate 22) if a counter (retraction) force is not present, is a conventional technique. FIG. 7 illustrates that a remote signalling device 53 can be used to generate a signal (received by antenna 51) to activate the locking mechanism 36.

FIGS. 8 and 9 illustrate a second embodiment of the locking mechanism of the present invention. In particular, a manual locking mechanism 40 having locking pin 38 is utilized. In operation, a driver inserts key 50 into locking mechanism 40 through aperture 52 in cover 54. Turning key 50 retracts locking pin 38 (unlocked position) allowing the driver to position back seat position 16. After the desired position is reached, locking pin 38 is forced into the aligned aperture by the push spring (not shown) locking back seat portion in the desired position.

Figure 10:
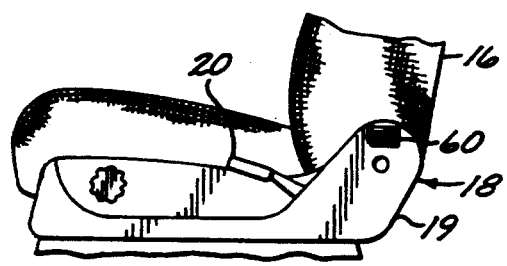
FIG. 10 illustrates another locking mechanism mounted on the mechanism external cover.
Figure 11:
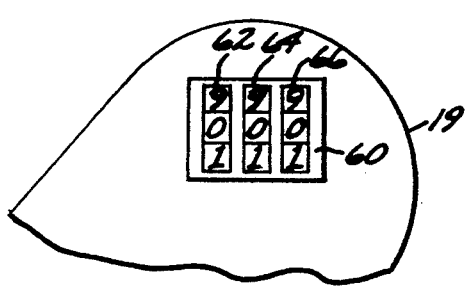
FIG. 11 is a detailed view of the locking mechanism of FIG. 10.

FIG. 10 shows a keyless manual lock 60 positioned on the cover member 19 and comprises three manually rotatable tumblers 62, 64 and 66 which, when set to a precoded three digit number, causes an associated locking key to retract from the aperture it has been in. FIG. 11 is a detailed view of the face of locking mechanism 60.

The angular position of back seat portion 16 relative to horizontal seat portion 14 in the anti-theft mode is not critical but should be small enough so that a thief would be unable to drive if the vehicle is started. An angular range between 10 degrees and 70 degrees has been found to be sufficient for that purpose.

The present invention thus provides a system which is relatively simple, inexpensive, and effective to prevent vehicle thefts. In this regard, it should be noted that the present invention can be utilized to prevent theft of other movable machines which have driver seats, in addition to the vehicles commonly associated with thefts, i.e. automobiles. Specifically, the present invention can also be used with tractors, buses, airplanes and so on.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A vehicle anti-theft system, a vehicle having a front driver seat comprising a seat portion and a rotatable back seat, the back seat being adjustable to a first position to allow a driver to utilize the vehicle and a second forward position which prevents normal vehicle operation comprising:

means for enabling the back seat to rotate between said first position and said second forward position comprising a back plate, a front plate, an intermediate plate member and a spring loaded central basebar, the back seat being rotatable about said basebar;

locking means mounted on said back plate and positioned adjacent a first aperture formed on said intermediate plate member when said back seat is in said second position, a second aperture being formed in said intermediate plate member and spaced arcuately from the first aperture; and means for activating said locking means whereby a lock pin is withdrawn from said first aperture to allow said back seat to move from said second position to said first position, said second aperture engaging said pin when said back seat is in said first position.

2. The combination of claim 1 wherein said lock pin is activated by a computer controlled data entry device.

3. The combination of claim 1 wherein said back seat is retained at an angle in the range from about 10° to about 70° to said seat portion when in said second position.

4. The combination of claim 1 wherein spring means are provided to automatically position said lock pin in said first aperture thereby locking said back seat in said second position.

5. The combination of claim 1 wherein said lock pin is activated by a remote controlled device.

6. The combination of claim 1 wherein said front and back plate members each have an aperture formed therein which is aligned with said first aperture in said intermediate plate member when said back seat is in said second position and aligned with said second aperture when said back seat is in said first position.

* * * * *